(12) United States Patent
Kar et al.

(10) Patent No.: US 9,056,603 B2
(45) Date of Patent: Jun. 16, 2015

(54) SYSTEM AND METHOD FOR CONTROLLING ENGINE TORQUE TO PREVENT DRIVELINE BUMP DURING A DOWNSHIFT WHEN A THROTTLE VALVE IS CLOSED

(71) Applicant: GM Global Technology Operations LLC, Detroit, MI (US)

(72) Inventors: Krishnendu Kar, South Lyon, MI (US); Leon Cribbins, Dexter, MI (US); William R. Mayhew, Ann Arbor, MI (US); Timothy J. Keenan, Clarkston, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 112 days.

(21) Appl. No.: 13/751,626

(22) Filed: Jan. 28, 2013

(65) Prior Publication Data

US 2013/0297160 A1 Nov. 7, 2013

Related U.S. Application Data

(60) Provisional application No. 61/640,973, filed on May 1, 2012.

(51) Int. Cl.
*B60W 10/06* (2006.01)
*B60W 30/18* (2012.01)
*F16H 63/50* (2006.01)

(52) U.S. Cl.
CPC ....... *B60W 10/06* (2013.01); *B60W 2710/0661* (2013.01); *B60W 2710/0605* (2013.01); *B60W 30/18072* (2013.01); *F16H 63/502* (2013.01); *B60W 2030/18081* (2013.01); *B60W 2510/1015* (2013.01); *B60W 2710/0644* (2013.01); *F16H 2306/54* (2013.01)

(58) Field of Classification Search
CPC .......... B60W 10/06; B60W 30/18072; B60W 2710/0644; B60W 2030/18081; B60W 2510/1015; B60W 2710/0661; B60W 2710/0605; F16H 63/502
USPC ......... 701/51, 54, 61, 64; 703/2, 6, 8; 477/34, 477/52–54, 58, 83, 90, 91, 107
See application file for complete search history.

(56) References Cited

U.S. PATENT DOCUMENTS

| | | | | |
|---|---|---|---|---|
| 3,776,048 A * | 12/1973 | Enomoto et al. | | 477/119 |
| 4,467,673 A * | 8/1984 | Hamada et al. | | 477/61 |
| 4,471,438 A * | 9/1984 | Futagi et al. | | 701/56 |
| 4,539,869 A * | 9/1985 | Suga et al. | | 477/63 |
| 5,157,608 A * | 10/1992 | Sankpal et al. | | 701/58 |
| 5,393,279 A * | 2/1995 | Bota et al. | | 477/143 |
| 6,346,063 B1 * | 2/2002 | Kondo et al. | | 477/143 |
| 7,189,187 B2 * | 3/2007 | Nakayashiki et al. | | 477/159 |
| 7,314,428 B2 * | 1/2008 | Nakajima et al. | | 477/118 |
| 7,374,513 B2 * | 5/2008 | Whitton | | 477/146 |
| 2006/0149433 A1 * | 7/2006 | Otsubo et al. | | 701/29 |
| 2008/0146412 A1 * | 6/2008 | Sagawa et al. | | 477/108 |
| 2010/0198468 A1 * | 8/2010 | Ota et al. | | 701/55 |

* cited by examiner

*Primary Examiner* — Russell Frejd

(57) ABSTRACT

A system according to the principles of the present disclosure includes a downshift determination module and a speed control module. The downshift determination module determines when a closed-throttle downshift occurs. The closed-throttle downshift is a downshift of a transmission when a throttle valve of an engine is closed. The speed control module controls engine speed based on turbine speed during the closed-throttle downshift. The turbine speed is a speed of a turbine in a torque converter that couples the engine to the transmission.

20 Claims, 7 Drawing Sheets

SYSTEM AND METHOD FOR CONTROLLING ENGINE TORQUE TO PREVENT DRIVELINE BUMP DURING A DOWNSHIFT WHEN A THROTTLE VALVE IS CLOSED

CROSS-REFERENCE TO RELATED APPLICATIONS

This application claims the benefit of U.S. Provisional Application No. 61/640,973, filed on May 1, 2012. The disclosure of the above application is incorporated herein by reference in its entirety.

FIELD

The present disclosure relates to systems and methods for controlling engine torque to prevent driveline bump during a downshift when a throttle valve is closed.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air and fuel mixture within cylinders to drive pistons, which produces drive torque. Air flow into the engine is regulated via a throttle. More specifically, the throttle adjusts the throttle area, which increases or decreases air flow into the engine. As the throttle area increases, the air flow into the engine increases. A fuel control system adjusts the rate that fuel is injected to provide a desired air/fuel mixture to the cylinders and/or to achieve a desired torque output. Increasing the amount of air and fuel provided to the cylinders increases the torque output of the engine.

In spark-ignition engines, spark initiates combustion of an air/fuel mixture provided to the cylinders. In compression-ignition engines, compression in the cylinders combusts the air/fuel mixture provided to the cylinders. Spark timing and air flow may be the primary mechanisms for adjusting the torque output of spark-ignition engines, while fuel flow may be the primary mechanism for adjusting the torque output of compression-ignition engines.

Engine control systems have been developed to control engine output torque to achieve a desired torque. Traditional engine control systems, however, do not control the engine output torque as accurately as desired. Further, traditional engine control systems do not provide a rapid response to control signals or coordinate engine torque control among various devices that affect the engine output torque.

SUMMARY

A system according to the principles of the present disclosure includes a downshift determination module and a speed control module. The downshift determination module determines when a closed-throttle downshift occurs. The closed-throttle downshift is a downshift of a transmission when a throttle valve of an engine is closed. The speed control module controls engine speed based on turbine speed during the closed-throttle downshift. The turbine speed is a speed of a turbine in a torque converter that couples the engine to the transmission.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

A torque converter is a hydrodynamic fluid coupling that transfers drive torque from an internal combustion engine to an automatic transmission. Torque converters include an impeller and a turbine. The impeller is mechanically coupled to the engine. The turbine is hydraulically coupled to the impeller and drives the transmission. Torque converter may also include a lock-up clutch that locks the turbine to the impeller, mechanically coupling the impeller and the turbine.

At the start of a shift, engine speed may be different from turbine speed due to slop in the hydraulic coupling between the impeller and the turbine. During a downshift when a throttle valve is closed, known as a closed-throttle downshift, the engine speed may cross the turbine speed, a phenomenon known as lash crossing. Lash crossing occurs when the engine speed increases from less than the turbine speed to greater than the turbine speed or when the engine speed decreases from greater than the turbine speed to less than the turbine speed. Lash crossing may result in an undesirable feel to the driver known as driveline bump.

An engine control system and method according to the principles of the present disclosure prevents lash crossing during a closed-throttle downshift to prevent driveline bump. If the engine speed is less than the turbine speed at the start of a closed-throttle downshift, then the engine speed is maintained at less than the turbine speed during the closed-throttle downshift. If the engine speed is greater than the turbine speed at the start of a closed-throttle downshift, then the engine speed is maintained at greater than the turbine speed during the closed-throttle downshift.

Figure 1:
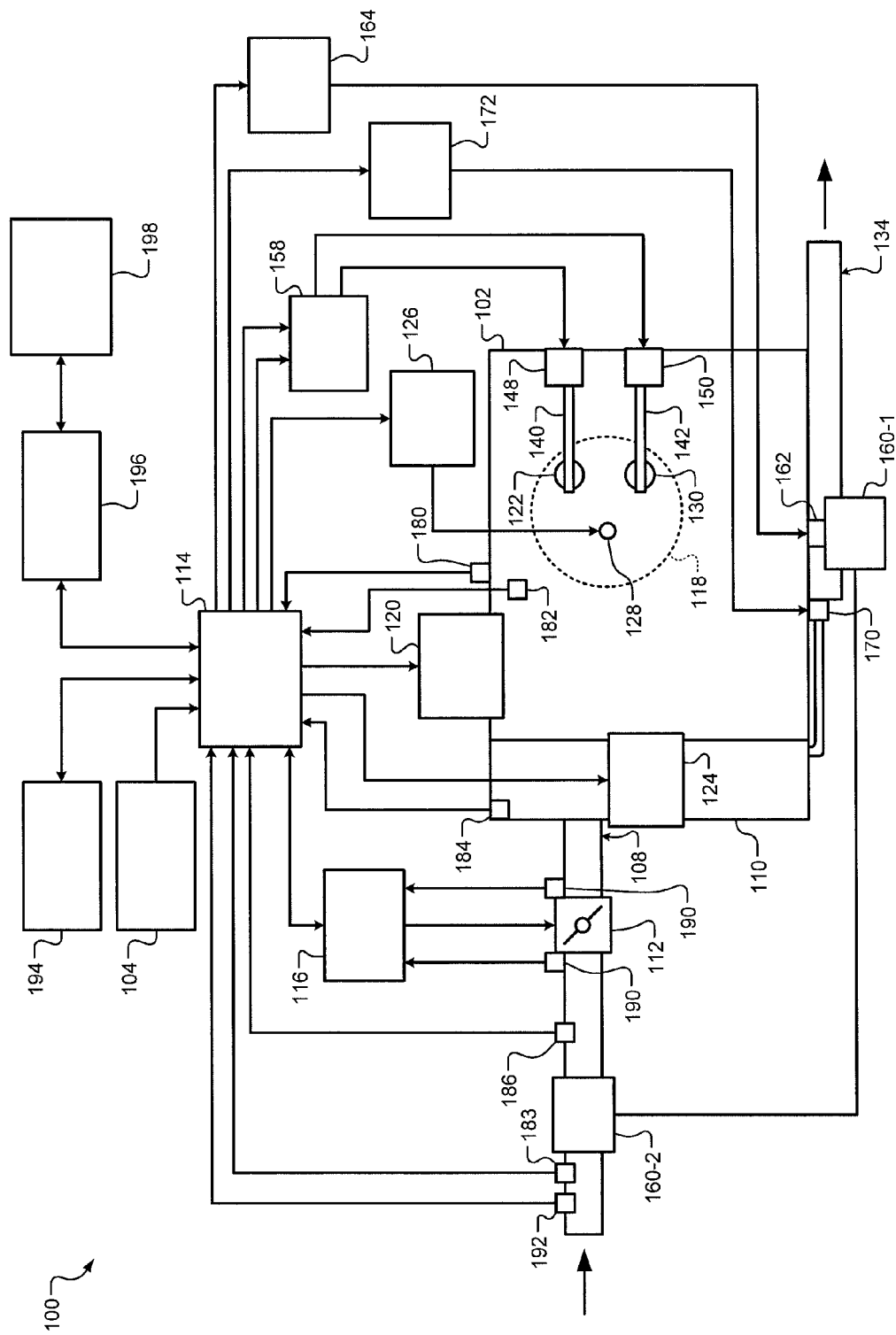
FIG. 1 is a functional block diagram of an example engine system according to the principles of the present disclosure.

Referring now to FIG. 1, a functional block diagram of an example engine system 100 is presented. The engine system 100 includes an engine 102 that combusts an air/fuel mixture to produce drive torque for a vehicle based on driver input from a driver input module 104. Air is drawn into the engine 102 through an intake system 108. For example only, the intake system 108 may include an intake manifold 110 and a throttle valve 112. For example only, the throttle valve 112 may include a butterfly valve having a rotatable blade. An engine control module (ECM) 114 controls a throttle actuator module 116, which regulates opening of the throttle valve 112 to control the amount of air drawn into the intake manifold 110.

Air from the intake manifold 110 is drawn into cylinders of the engine 102. While the engine 102 may include multiple cylinders, for illustration purposes a single representative cylinder 118 is shown. For example only, the engine 102 may include 2, 3, 4, 5, 6, 8, 10, and/or 12 cylinders. The ECM 114 may instruct a cylinder actuator module 120 to selectively deactivate some of the cylinders, which may improve fuel economy under certain engine operating conditions.

The engine 102 may operate using a four-stroke cycle. The four strokes, described below, are named the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes.

During the intake stroke, air from the intake manifold 110 is drawn into the cylinder 118 through an intake valve 122. The ECM 114 controls a fuel actuator module 124, which regulates fuel injection to achieve a desired air/fuel ratio. Fuel may be injected into the intake manifold 110 at a central location or at multiple locations, such as near the intake valve 122 of each of the cylinders. In various implementations (not shown), fuel may be injected directly into the cylinders or into mixing chambers associated with the cylinders. The fuel actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. The engine 102 may be a compression-ignition engine, in which case compression in the cylinder 118 ignites the air/fuel mixture. Alternatively, the engine 102 may be a spark-ignition engine, in which case a spark actuator module 126 energizes a spark plug 128 in the cylinder 118 based on a signal from the ECM 114, which ignites the air/fuel mixture. The timing of the spark may be specified relative to the time when the piston is at its topmost position, referred to as top dead center (TDC).

The spark actuator module 126 may be controlled by a timing signal specifying how far before or after TDC to generate the spark. Because piston position is directly related to crankshaft rotation, operation of the spark actuator module 126 may be synchronized with crankshaft angle. In various implementations, the spark actuator module 126 may halt provision of spark to deactivated cylinders.

Generating the spark may be referred to as a firing event. The spark actuator module 126 may have the ability to vary the timing of the spark for each firing event. The spark actuator module 126 may even be capable of varying the spark timing for a next firing event when the spark timing signal is changed between a last firing event and the next firing event.

During the combustion stroke, the combustion of the air/fuel mixture drives the piston down, thereby driving the crankshaft. The combustion stroke may be defined as the time between the piston reaching TDC and the time at which the piston returns to bottom dead center (BDC).

During the exhaust stroke, the piston begins moving up from BDC and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118).

The cylinder actuator module 120 may deactivate the cylinder 118 by disabling opening of the intake valve 122 and/or the exhaust valve 130. In various other implementations, the intake valve 122 and/or the exhaust valve 130 may be controlled by devices other than camshafts, such as electromagnetic actuators.

The time at which the intake valve 122 is opened may be varied with respect to piston TDC by an intake cam phaser 148. The time at which the exhaust valve 130 is opened may be varied with respect to piston TDC by an exhaust cam phaser 150. A phaser actuator module 158 may control the intake cam phaser 148 and the exhaust cam phaser 150 based on signals from the ECM 114. When implemented, variable valve lift (not shown) may also be controlled by the phaser actuator module 158.

The engine system 100 may include a boost device that provides pressurized air to the intake manifold 110. For example, FIG. 1 shows a turbocharger including a hot turbine 160-1 that is powered by hot exhaust gases flowing through the exhaust system 134. The turbocharger also includes a cold air compressor 160-2, driven by the turbine 160-1, that compresses air leading into the throttle valve 112. In various implementations, a supercharger (not shown), driven by the crankshaft, may compress air from the throttle valve 112 and deliver the compressed air to the intake manifold 110.

A wastegate 162 may allow exhaust to bypass the turbine 160-1, thereby reducing the boost (the amount of intake air compression) of the turbocharger. The ECM 114 may control the turbocharger via a boost actuator module 164. The boost actuator module 164 may modulate the boost of the turbocharger by controlling the position of the wastegate 162. In various implementations, multiple turbochargers may be controlled by the boost actuator module 164. The turbocharger may have variable geometry, which may be controlled by the boost actuator module 164.

An intercooler (not shown) may dissipate some of the heat contained in the compressed air charge, which is generated as the air is compressed. The compressed air charge may also have absorbed heat from components of the exhaust system 134. Although shown separated for purposes of illustration, the turbine 160-1 and the compressor 160-2 may be attached to each other, placing intake air in close proximity to hot exhaust.

The engine system 100 may include an exhaust gas recirculation (EGR) valve 170, which selectively redirects exhaust gas back to the intake manifold 110. The EGR valve 170 may be located upstream of the turbocharger's turbine 160-1. The EGR valve 170 may be controlled by an EGR actuator module 172.

The engine system 100 may measure the position of the crankshaft using a crankshaft position (CKP) sensor 180. The ECM 114 may use the crankshaft position to calculate engine speed in, for example, revolutions per minute (rpm). The temperature of the engine coolant may be measured using an engine coolant temperature (ECT) sensor 182. The ECT sensor 182 may be located within the engine 102 or at other locations where the coolant is circulated, such as a radiator (not shown).

Atmospheric pressure may be measured using an atmospheric pressure (ATM) sensor 183. The pressure within the intake manifold 110 may be measured using a manifold absolute pressure (MAP) sensor 184. In various implementations, engine vacuum, which is the difference between the ambient air pressure and the pressure within the intake manifold 110, may be measured. The mass flow rate of air flowing into the intake manifold 110 may be measured using a mass air flow (MAF) sensor 186. In various implementations, the MAF sensor 186 may be located in a housing that also includes the throttle valve 112.

The throttle actuator module 116 may monitor the position of the throttle valve 112 using one or more throttle position sensors (TPS) 190. The ambient temperature of air being drawn into the engine 102 may be measured using an intake air temperature (IAT) sensor 192. The ECM 114 may use signals from the sensors to make control decisions for the engine system 100.

The ECM 114 may communicate with a transmission control module (TCM) 194 to coordinate shifting gears in a transmission (not shown). For example, the ECM 114 may reduce engine torque during a gear shift. The ECM 114 may communicate with a hybrid control module (HCM) 196 to coordinate operation of the engine 102 and an electric motor 198.

The electric motor 198 may also function as a generator, and may be used to produce electrical energy for use by vehicle electrical systems and/or for storage in a battery. In various implementations, various functions of the ECM 114, the TCM 194, and the HCM 196 may be integrated into one or more modules.

Each system that varies an engine parameter may be referred to as an actuator that receives an actuator value. For example, the throttle actuator module 116 may be referred to as an actuator and the throttle opening area may be referred to as the actuator value. In the example of FIG. 1, the throttle actuator module 116 achieves the throttle opening area by adjusting an angle of the blade of the throttle valve 112.

Similarly, the spark actuator module 126 may be referred to as an actuator, while the corresponding actuator value may be the amount of spark advance relative to cylinder TDC. Other actuators may include the cylinder actuator module 120, the fuel actuator module 124, the phaser actuator module 158, the boost actuator module 164, and the EGR actuator module 172. For these actuators, the actuator values may correspond to number of activated cylinders, fueling rate, intake and exhaust cam phaser angles, boost pressure, and EGR valve opening area, respectively. The ECM 114 may control actuator values in order to cause the engine 102 to generate a desired engine output torque.

Figure 2:
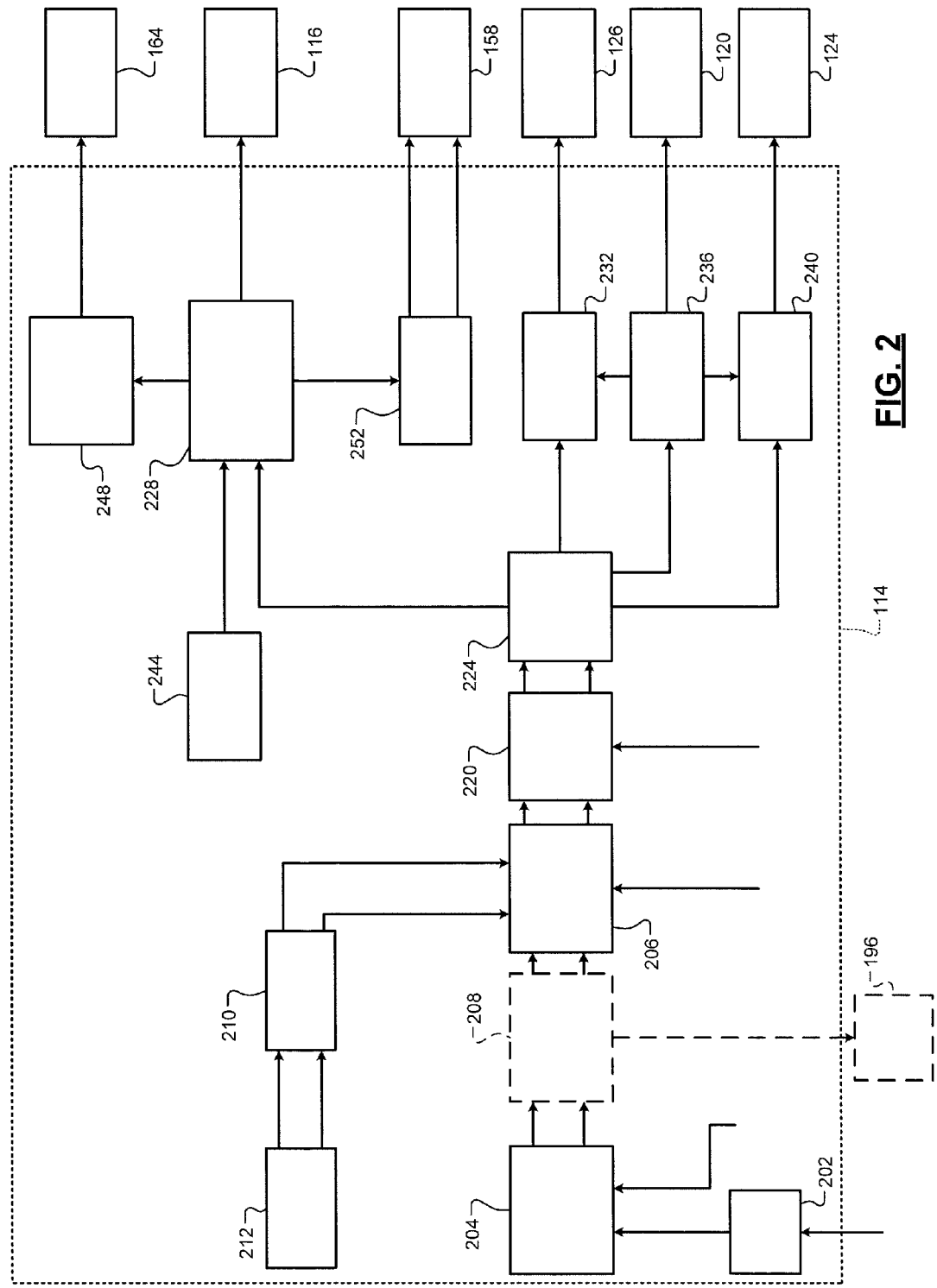
FIG. 2 is a functional block diagram of an example engine control system according to the principles of the present disclosure.

Referring now to FIG. 2, a functional block diagram of an example engine control system is presented. An example implementation of the ECM 114 includes a driver torque module 202. The driver torque module 202 may determine a driver torque request based on a driver input from the driver input module 104. The driver input may be based on a position of an accelerator pedal. The driver input may also be based on cruise control, which may be an adaptive cruise control system that varies vehicle speed to maintain a predetermined following distance. The driver torque module 202 may store one or more mappings of accelerator pedal position to desired torque, and may determine the driver torque request based on a selected one of the mappings.

An axle torque arbitration module 204 arbitrates between the driver torque request from the driver torque module 202 and other axle torque requests. Axle torque (torque at the wheels) may be produced by various sources including an engine and/or an electric motor. Torque requests may include absolute torque requests as well as relative torque requests and ramp requests. For example only, ramp requests may include a request to ramp torque down to a minimum engine off torque or to ramp torque up from the minimum engine off torque. Relative torque requests may include temporary or persistent torque reductions or increases.

Axle torque requests may include a torque reduction requested by a traction control system when positive wheel slip is detected. Positive wheel slip occurs when axle torque overcomes friction between the wheels and the road surface, and the wheels begin to slip against the road surface. Axle torque requests may also include a torque increase request to counteract negative wheel slip, where a tire of the vehicle slips with respect to the road surface because the axle torque is negative.

Axle torque requests may also include brake management requests and vehicle over-speed torque requests. Brake management requests may reduce axle torque to ensure that the axle torque does not exceed the ability of the brakes to hold the vehicle when the vehicle is stopped. Vehicle over-speed torque requests may reduce the axle torque to prevent the vehicle from exceeding a predetermined speed. Axle torque requests may also be generated by vehicle stability control systems.

The axle torque arbitration module 204 outputs a predicted torque request and an immediate torque request based on the results of arbitrating between the received torque requests. As described below, the predicted and immediate torque requests from the axle torque arbitration module 204 may selectively be adjusted by other modules of the ECM 114 before being used to control actuators of the engine system 100.

In general terms, the immediate torque request is the amount of currently desired axle torque, while the predicted torque request is the amount of axle torque that may be needed on short notice. The ECM 114 therefore controls the engine system 100 to produce an axle torque equal to the immediate torque request. However, different combinations of actuator values may result in the same axle torque. The ECM 114 may therefore adjust the actuator values to allow a faster transition to the predicted torque request, while still maintaining the axle torque at the immediate torque request.

In various implementations, the predicted torque request may be based on the driver torque request. The immediate torque request may be less than the predicted torque request, such as when the driver torque request is causing wheel slip on an icy surface. In such a case, a traction control system (not shown) may request a reduction via the immediate torque request, and the ECM 114 reduces the torque produced by the engine system 100 to the immediate torque request. However, the ECM 114 controls the engine system 100 so that the engine system 100 can quickly resume producing the predicted torque request once the wheel slip stops.

In general terms, the difference between the immediate torque request and the higher predicted torque request can be referred to as a torque reserve. The torque reserve may represent the amount of additional torque that the engine system 100 can begin to produce with minimal delay. Fast engine actuators are used to increase or decrease current axle torque. As described in more detail below, fast engine actuators are defined in contrast with slow engine actuators.

In various implementations, fast engine actuators are capable of varying axle torque within a range, where the range is established by the slow engine actuators. In such implementations, the upper limit of the range is the predicted torque request, while the lower limit of the range is limited by the torque capacity of the fast actuators. For example only, fast actuators may only be able to reduce axle torque by a first amount, where the first amount is a measure of the torque capacity of the fast actuators. The first amount may vary based on engine operating conditions set by the slow engine actuators. When the immediate torque request is within the range, fast engine actuators can be set to cause the axle torque to be equal to the immediate torque request. When the ECM 114 requests the predicted torque request to be output, the fast engine actuators can be controlled to vary the axle torque to the top of the range, which is the predicted torque request.

In general terms, fast engine actuators can more quickly change the axle torque when compared to slow engine actuators. Slow actuators may respond more slowly to changes in their respective actuator values than fast actuators do. For example, a slow actuator may include mechanical components that require time to move from one position to another in response to a change in actuator value. A slow actuator may also be characterized by the amount of time it takes for the axle torque to begin to change once the slow actuator begins to implement the changed actuator value. Generally, this amount of time will be longer for slow actuators than for fast actuators. In addition, even after beginning to change, the axle torque may take longer to fully respond to a change in a slow actuator.

For example only, the ECM 114 may set actuator values for slow actuators to values that would enable the engine system 100 to produce the predicted torque request if the fast actuators were set to appropriate values. Meanwhile, the ECM 114 may set actuator values for fast actuators to values that, given the slow actuator values, cause the engine system 100 to produce the immediate torque request instead of the predicted torque request.

The fast actuator values therefore cause the engine system 100 to produce the immediate torque request. When the ECM 114 decides to transition the axle torque from the immediate torque request to the predicted torque request, the ECM 114 changes the actuator values for one or more fast actuators to values that correspond to the predicted torque request. Because the slow actuator values have already been set based on the predicted torque request, the engine system 100 is able to produce the predicted torque request after only the delay imposed by the fast actuators. In other words, the longer delay that would otherwise result from changing axle torque using slow actuators is avoided.

For example only, when the predicted torque request is equal to the driver torque request, a torque reserve may be created when the immediate torque request is less than the driver torque request due to a temporary torque reduction request. Alternatively, a torque reserve may be created by increasing the predicted torque request above the driver torque request while maintaining the immediate torque request at the driver torque request. The resulting torque reserve can absorb sudden increases in required axle torque. For example only, sudden loads from an air conditioner or a power steering pump may be counterbalanced by increasing the immediate torque request. If the increase in immediate torque request is less than the torque reserve, the increase can be quickly produced by using fast actuators. The predicted torque request may then also be increased to re-establish the previous torque reserve.

Another example use of a torque reserve is to reduce fluctuations in slow actuator values. Because of their relatively slow speed, varying slow actuator values may produce control instability. In addition, slow actuators may include mechanical parts, which may draw more power and/or wear more quickly when moved frequently. Creating a sufficient torque reserve allows changes in desired torque to be made by varying fast actuators via the immediate torque request while maintaining the values of the slow actuators. For example, to maintain a given idle speed, the immediate torque request may vary within a range. If the predicted torque request is set to a level above this range, variations in the immediate torque request that maintain the idle speed can be made using fast actuators without the need to adjust slow actuators.

For example only, in a spark-ignition engine, spark timing may be a fast actuator value, while throttle opening area may be a slow actuator value. Spark-ignition engines may combust fuels including, for example, gasoline and ethanol, by applying a spark. By contrast, in a compression-ignition engine, fuel flow may be a fast actuator value, while throttle opening area may be used as an actuator value for engine characteristics other than torque. Compression-ignition engines may combust fuels including, for example, diesel, by compressing the fuels.

When the engine 102 is a spark-ignition engine, the spark actuator module 126 may be a fast actuator and the throttle actuator module 116 may be a slow actuator. After receiving a new actuator value, the spark actuator module 126 may be able to change spark timing for the following firing event. When the spark timing (also called spark advance) for a firing event is set to a calibrated value, maximum torque is produced in the combustion stroke immediately following the firing event. However, a spark advance deviating from the calibrated value may reduce the amount of torque produced in the combustion stroke. Therefore, the spark actuator module 126 may be able to vary engine output torque as soon as the next firing event occurs by varying spark advance. For example only, a table of spark advances corresponding to different engine operating conditions may be determined during a calibration phase of vehicle design, and the calibrated value is selected from the table based on current engine operating conditions.

By contrast, changes in throttle opening area take longer to affect engine output torque. The throttle actuator module 116 changes the throttle opening area by adjusting the angle of the blade of the throttle valve 112. Therefore, once a new actuator value is received, there is a mechanical delay as the throttle valve 112 moves from its previous position to a new position based on the new actuator value. In addition, air flow changes based on the throttle valve opening are subject to air transport delays in the intake manifold 110. Further, increased air flow in the intake manifold 110 is not realized as an increase in engine output torque until the cylinder 118 receives additional air in the next intake stroke, compresses the additional air, and commences the combustion stroke.

Using these actuators as an example, a torque reserve can be created by setting the throttle opening area to a value that would allow the engine 102 to produce a predicted torque request. Meanwhile, the spark timing can be set based on an immediate torque request that is less than the predicted torque request. Although the throttle opening area generates enough air flow for the engine 102 to produce the predicted torque request, the spark timing is retarded (which reduces torque)

based on the immediate torque request. The engine output torque will therefore be equal to the immediate torque request.

When additional torque is needed, such as when the air conditioning compressor is started, or when traction control determines wheel slip has ended, the spark timing can be set based on the predicted torque request. By the following firing event, the spark actuator module 126 may return the spark advance to a calibrated value, which allows the engine 102 to produce the full engine output torque achievable with the air flow already present. The engine output torque may therefore be quickly increased to the predicted torque request without experiencing delays from changing the throttle opening area.

When the engine 102 is a compression-ignition engine, the fuel actuator module 124 may be a fast actuator and the throttle actuator module 116 and the boost actuator module 164 may be emissions actuators. In this manner, the fuel mass may be set based on the immediate torque request, and the throttle opening area and boost may be set based on the predicted torque request. The throttle opening area may generate more air flow than necessary to satisfy the predicted torque request. In turn, the air flow generated may be more than required for complete combustion of the injected fuel such that the air/fuel ratio is usually lean and changes in air flow do not affect the engine torque output. The engine output torque will therefore be equal to the immediate torque request and may be increased or decreased by adjusting the fuel flow.

The throttle actuator module 116, the boost actuator module 164, and the EGR actuator module 172 may be controlled based on the predicted torque request to control emissions and to minimize turbo lag. The throttle actuator module 116 may create a vacuum to draw exhaust gases through the EGR valve 170 and into the intake manifold 110.

The axle torque arbitration module 204 may output the predicted torque request and the immediate torque request to a propulsion torque arbitration module 206. In various implementations, the axle torque arbitration module 204 may output the predicted and immediate torque requests to a hybrid optimization module 208. The hybrid optimization module 208 determines how much torque should be produced by the engine 102 and how much torque should be produced by the electric motor 198. The hybrid optimization module 208 then outputs modified predicted and immediate torque requests to the propulsion torque arbitration module 206. In various implementations, the hybrid optimization module 208 may be implemented in the HCM 196.

The predicted and immediate torque requests received by the propulsion torque arbitration module 206 are converted from an axle torque domain (torque at the wheels) into a propulsion torque domain (torque at the crankshaft). This conversion may occur before, after, as part of, or in place of the hybrid optimization module 208.

The propulsion torque arbitration module 206 arbitrates between propulsion torque requests, including the converted predicted and immediate torque requests. The propulsion torque arbitration module 206 generates an arbitrated predicted torque request and an arbitrated immediate torque request. The arbitrated torques may be generated by selecting a winning request from among received requests. Alternatively or additionally, the arbitrated torques may be generated by modifying one of the received requests based on another one or more of the received requests.

Other propulsion torque requests may include torque reductions for engine over-speed protection, torque increases for stall prevention, and torque reductions requested by the TCM 194 to accommodate gear shifts. Propulsion torque requests may also result from clutch fuel cutoff, which reduces the engine output torque when the driver depresses the clutch pedal in a manual transmission vehicle to prevent a flare (rapid rise) in engine speed.

Propulsion torque requests may also include an engine shutoff request, which may be initiated when a critical fault is detected. For example only, critical faults may include detection of vehicle theft, a stuck starter motor, electronic throttle control problems, and unexpected torque increases. In various implementations, when an engine shutoff request is present, arbitration selects the engine shutoff request as the winning request. When the engine shutoff request is present, the propulsion torque arbitration module 206 may output zero as the arbitrated torques.

In various implementations, an engine shutoff request may simply shut down the engine 102 separately from the arbitration process. The propulsion torque arbitration module 206 may still receive the engine shutoff request so that, for example, appropriate data can be fed back to other torque requestors. For example, all other torque requestors may be informed that they have lost arbitration.

A speed control module 210 may also output predicted and immediate torque requests to the propulsion torque arbitration module 206. The torque requests from the speed control module 210 may prevail in arbitration when the ECM 114 is in a speed mode. Speed mode may be enabled when the driver removes their foot from the accelerator pedal, such as when the engine 102 is idling or when the vehicle is coasting down from a higher speed. Alternatively or additionally, speed mode may be enabled when the predicted torque request from the axle torque arbitration module 204 is less than a predetermined torque value.

The speed control module 210 receives an actual speed and a desired speed from a speed trajectory module 212 and controls the predicted and immediate torque requests to reduce the difference between the actual speed and the desired speed. For example only, the speed trajectory module 212 may output a linearly decreasing desired speed for vehicle coastdown until an idle speed is reached. The speed trajectory module 212 may then continue outputting the idle speed as the desired speed. In the preceding example, the linearly decreasing desired speed may be referred to as a reference speed and the idle speed may be referred to as the desired speed. The speed control module 210 may receive both the reference speed and the desired speed from the speed trajectory module 212.

A reserves/loads module 220 receives the arbitrated predicted and immediate torque requests from the propulsion torque arbitration module 206. The reserves/loads module 220 may adjust the arbitrated predicted and immediate torque requests to create a torque reserve and/or to compensate for one or more loads. The reserves/loads module 220 then outputs the adjusted predicted and immediate torque requests to an actuation module 224. The actuation module 224 may be referred to as a torque control module.

For example only, a catalyst light-off process or a cold start emissions reduction process may require retarded spark advance. The reserves/loads module 220 may therefore increase the adjusted predicted torque request above the adjusted immediate torque request to create retarded spark for the cold start emissions reduction process. In another example, the air/fuel ratio of the engine and/or the mass air flow may be directly varied, such as by diagnostic intrusive equivalence ratio testing and/or new engine purging. Before beginning these processes, a torque reserve may be created or increased to quickly offset decreases in engine output torque that result from leaning the air/fuel mixture during these processes.

The reserves/loads module 220 may also create or increase a torque reserve in anticipation of a future load, such as power steering pump operation or engagement of an air conditioning (NC) compressor clutch. The reserve for engagement of the NC compressor clutch may be created when the driver first requests air conditioning. The reserves/loads module 220 may increase the adjusted predicted torque request while leaving the adjusted immediate torque request unchanged to produce the torque reserve. Then, when the A/C compressor clutch engages, the reserves/loads module 220 may increase the immediate torque request by the estimated load of the A/C compressor clutch.

The actuation module 224 receives the adjusted predicted and immediate torque requests from the reserves/loads module 220. The actuation module 224 determines how the adjusted predicted and immediate torque requests will be achieved. The actuation module 224 may be engine type specific. For example, the actuation module 224 may be implemented differently or use different control schemes for spark-ignition engines versus compression-ignition engines.

In various implementations, the actuation module 224 may define a boundary between modules that are common across all engine types and modules that are engine type specific. For example, engine types may include spark-ignition and compression-ignition. Modules prior to the actuation module 224, such as the propulsion torque arbitration module 206, may be common across engine types, while the actuation module 224 and subsequent modules may be engine type specific.

For example, in a spark-ignition engine, the actuation module 224 may vary the opening of the throttle valve 112 as a slow actuator that allows for a wide range of torque control. The actuation module 224 may disable cylinders using the cylinder actuator module 120, which also provides for a wide range of torque control but may also be slow and may involve drivability and emissions concerns. The actuation module 224 may use spark timing as a fast actuator. However, spark timing may not provide as much range of torque control. In addition, the amount of torque control possible with changes in spark timing (referred to as spark reserve capacity) may vary as air flow changes.

In various implementations, the actuation module 224 may generate an air torque request based on the adjusted predicted torque request. The air torque request may be equal to the adjusted predicted torque request, setting air flow so that the adjusted predicted torque request can be achieved by changes to other actuators.

An air control module 228 may determine desired actuator values based on the air torque request. For example, the air control module 228 may control desired manifold absolute pressure (MAP), desired throttle area, and/or desired air per cylinder (APC). Desired MAP may be used to determine desired boost, and desired APC may be used to determine desired cam phaser positions. In various implementations, the air control module 228 may also determine an amount of opening of the EGR valve 170.

The actuation module 224 may also generate a spark torque request, a cylinder shut-off torque request, and a fuel torque request. The spark torque request may be used by a spark control module 232 to determine how much to retard the spark timing (which reduces engine output torque) from a calibrated spark advance.

The cylinder shut-off torque request may be used by a cylinder control module 236 to determine how many cylinders to deactivate. The cylinder control module 236 may instruct the cylinder actuator module 120 to deactivate one or more cylinders of the engine 102. In various implementations, a predefined group of cylinders may be deactivated jointly.

The cylinder control module 236 may also instruct a fuel control module 240 to stop providing fuel for deactivated cylinders and may instruct the spark control module 232 to stop providing spark for deactivated cylinders. In various implementations, the spark control module 232 only stops providing spark for a cylinder once any fuel/air mixture already present in the cylinder has been combusted.

In various implementations, the cylinder actuator module 120 may include a hydraulic system that selectively decouples intake and/or exhaust valves from the corresponding camshafts for one or more cylinders in order to deactivate those cylinders. For example only, valves for half of the cylinders are either hydraulically coupled or decoupled as a group by the cylinder actuator module 120. In various implementations, cylinders may be deactivated simply by halting provision of fuel to those cylinders without stopping the opening and closing of the intake and exhaust valves. In such implementations, the cylinder actuator module 120 may be omitted.

The fuel control module 240 may vary the amount of fuel provided to each cylinder based on the fuel torque request from the actuation module 224. During normal operation of a spark-ignition engine, the fuel control module 240 may operate in an air lead mode in which the fuel control module 240 attempts to maintain a stoichiometric air/fuel ratio by controlling fuel flow based on air flow. The fuel control module 240 may determine a fuel mass that will yield stoichiometric combustion when combined with the current amount of air per cylinder. The fuel control module 240 may instruct the fuel actuator module 124 via the fueling rate to inject this fuel mass for each activated cylinder.

In compression-ignition systems, the fuel control module 240 may operate in a fuel lead mode in which the fuel control module 240 determines a fuel mass for each cylinder that satisfies the fuel torque request while minimizing emissions, noise, and fuel consumption. In the fuel lead mode, air flow is controlled based on fuel flow and may be controlled to yield a lean air/fuel ratio. In addition, the air/fuel ratio may be maintained above a predetermined level, which may prevent black smoke production in dynamic engine operating conditions.

A mode setting may determine how the actuation module 224 treats the adjusted immediate torque request. The mode setting may be provided to the actuation module 224, such as by the propulsion torque arbitration module 206, and may select modes including an inactive mode, a pleasible mode, a maximum range mode, and an auto actuation mode.

In the inactive mode, the actuation module 224 may ignore the adjusted immediate torque request and set engine output torque based on the adjusted predicted torque request. The actuation module 224 may therefore set the spark torque request, the cylinder shut-off torque request, and the fuel torque request to the adjusted predicted torque request, which maximizes engine output torque for the current engine air flow conditions. Alternatively, the actuation module 224 may set these requests to predetermined (such as out-of-range high) values to disable torque reductions from retarding spark, deactivating cylinders, or reducing the fuel/air ratio.

In the pleasible mode, the actuation module 224 outputs the adjusted predicted torque request as the air torque request and attempts to achieve the adjusted immediate torque request by adjusting only spark advance. The actuation module 224 therefore outputs the adjusted immediate torque request as the spark torque request. The spark control module 232 will retard the spark as much as possible to attempt to achieve the spark torque request. If the desired torque reduction is greater than the spark reserve capacity (the amount of torque reduction achievable by spark retard), the torque reduction may not be achieved. The engine output torque will then be greater than the adjusted immediate torque request.

In the maximum range mode, the actuation module 224 may, output the adjusted predicted torque request as the air torque request and the adjusted immediate torque request as the spark torque request. In addition, the actuation module 224 may decrease the cylinder shut-off torque request (thereby deactivating cylinders) when reducing spark advance alone is unable to achieve the adjusted immediate torque request.

In the auto actuation mode, the actuation module 224 may decrease the air torque request based on the adjusted immediate torque request. In various implementations, the air torque request may be reduced only so far as is necessary to allow the spark control module 232 to achieve the adjusted immediate torque request by adjusting spark advance. Therefore, in auto actuation mode, the adjusted immediate torque request is achieved while adjusting the air torque request as little as possible. In other words, the use of relatively slowly-responding throttle valve opening is minimized by reducing the quickly-responding spark advance as much as possible. This allows the engine 102 to return to producing the adjusted predicted torque request as quickly as possible.

A torque estimation module 244 may estimate torque output of the engine 102. This estimated torque may be used by the air control module 228 to perform closed-loop control of engine air flow parameters, such as throttle area, MAP, and phaser positions. For example, a torque relationship such as $$T = f(APC, S, I, E, AF, OT, \#) \quad (1)$$

may be defined, where torque (T) is a function of air per cylinder (APC), spark advance (S), intake cam phaser position (I), exhaust cam phaser position (E), air/fuel ratio (AF), oil temperature (OT), and number of activated cylinders (#). Additional variables may also be accounted for, such as the degree of opening of an exhaust gas recirculation (EGR) valve.

This relationship may be modeled by an equation and/or may be stored as a lookup table. The torque estimation module 244 may determine APC based on the measured MAF and the actual engine speed, thereby allowing closed loop air control based on actual air flow. The intake and exhaust cam phaser positions used may be based on actual positions, as the phasers may be traveling toward desired positions.

The actual spark advance may be used to estimate the actual engine output torque. When a calibrated spark advance value is used to estimate torque, the estimated torque may be called an estimated air torque, or simply air torque. The air torque is an estimate of how much torque the engine could generate at the current air flow if spark retard was removed (i.e., spark timing was set to the calibrated spark advance value) and all cylinders were fueled.

The air control module 228 may output a desired throttle area to the throttle actuator module 116. The throttle actuator module 116 then regulates the throttle valve 112 to produce the desired throttle area. The air control module 228 may determine the desired throttle area based on an inverse torque model and the air torque request. The air control module 228 may use the estimated air torque and/or the MAF signal in order to perform closed loop control. For example, the desired throttle area may be controlled to minimize a difference between the estimated air torque and the air torque request.

The air control module 228 may output a desired manifold absolute pressure (MAP) signal to a boost scheduling module 248. The boost scheduling module 248 uses the desired MAP signal to control the boost actuator module 164. The boost actuator module 164 then controls one or more turbochargers (e.g., the turbocharger including the turbine 160-1 and the compressor 160-2) and/or superchargers.

The air control module 228 may also output a desired air per cylinder (APC) signal to a phaser scheduling module 252. Based on the desired APC signal and the actual engine speed, the phaser scheduling module 252 may control positions of the intake and/or exhaust cam phasers 148 and 150 using the phaser actuator module 158.

Referring back to the spark control module 232, calibrated spark advance values may vary based on various engine operating conditions. For example only, a torque relationship may be inverted to solve for desired spark advance. For a given torque request ($T_{des}$), the desired spark advance ($S_{des}$) may be determined based on $$S_{des} = f^{-1}(T_{des}, APC, I, E, AF, OT, \#). \quad (2)$$

This relationship may be embodied as an equation and/or as a lookup table. The air/fuel ratio may be the actual air/fuel ratio, as reported by the fuel control module 240.

When the spark advance is set to the calibrated spark advance, the resulting torque may be as close to mean best torque (MBT) as possible. MBT refers to the maximum engine output torque that is generated for a given air flow as spark advance is increased, while using fuel having an octane rating greater than a predetermined threshold and using stoichiometric fueling. The spark advance at which this maximum torque occurs is referred to as MBT spark. The calibrated spark advance may differ slightly from MBT spark because of, for example, fuel quality (such as when lower octane fuel is used) and environmental factors. The torque at the calibrated spark advance may therefore be less than MBT.

Figure 3:
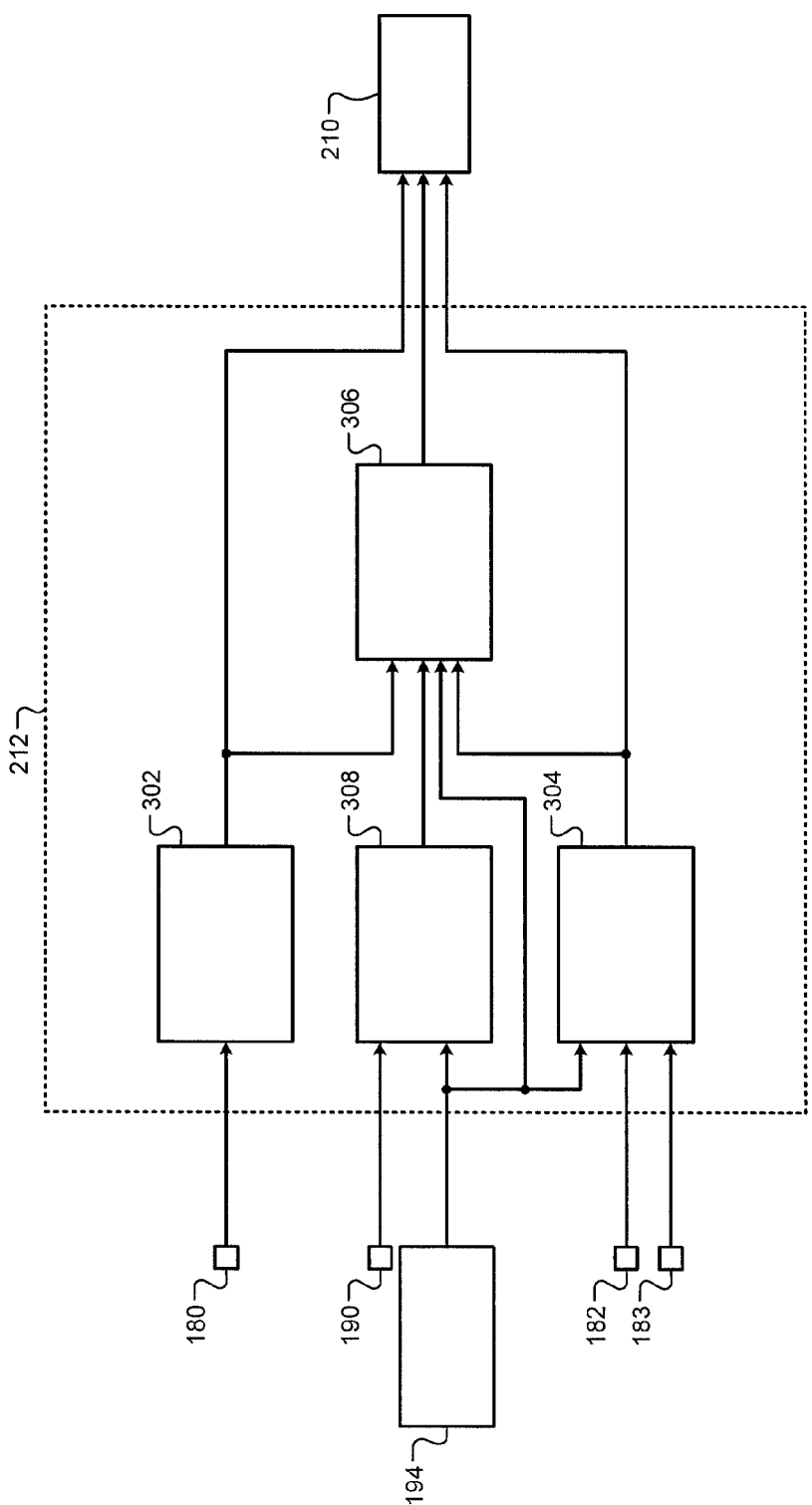
FIG. 3 is a functional block diagram of a first example control module according to the principles of the present disclosure.

Referring now to FIG. 3, an example implementation of the speed trajectory module 212 includes an actual speed determination module 302, a desired speed determination module 304, and a reference speed determination module 306. The actual speed determination module 302 determines the actual speed of the engine 102 based on the crankshaft position received from the CKP sensor 180. For example, the actual speed determination module 302 may calculate the actual speed based on a period that elapses as the crankshaft completes one or more revolutions.

The desired speed determination module 304 determines the desired speed of the engine 102. The desired speed determination module 304 may determine the desired speed based on a first speed and a second speed. The first speed may be an idle speed, which may be determined based on various engine operating conditions such as the engine coolant temperature, atmospheric pressure, and transmission load. The second speed may be equal to the sum of a turbine speed and a first offset.

The sign and magnitude of the first offset may be adjusted based on whether a closed-throttle downshift is in progress and/or whether the actual speed is greater than or less than the turbine speed at the start of the closed-throttle downshift. The first offset may have a negative value (e.g., −50 rpm) when a closed-throttle downshift is not in progress or when a closed-throttle downshift is in progress and the actual speed is less than the turbine speed at the start of the downshift. The first offset may have a positive value (e.g., 150 to 200 rpm) when a closed-throttle downshift is in progress and the actual speed is greater than the turbine speed at the start of the downshift.

The desired speed determination module 304 may set the desired speed equal to a maximum of the first speed and the second speed when the vehicle speed is greater than a threshold (e.g., 7 kilometers per hour (kph)). Otherwise, the desired speed determination module 304 may set the desired speed equal to the first speed. The desired speed determination module 304 may receive the engine coolant temperature and the atmospheric pressure from the ECT sensor 182 and the ATM sensor 183, respectively. The desired speed determination module 304 may receive the transmission load, the turbine speed, and the vehicle speed from the TCM 194. Alternatively, the vehicle speed may be received directly from a vehicle speed sensor.

The reference speed determination module 306 determines the reference speed, which is used to transition the actual speed to the desired speed. The reference speed determination module 306 may initialize the reference speed when the speed mode is enabled to avoid a sudden change in engine torque. The reference speed determination module 306 may initialize the reference speed by setting the reference speed equal to the actual speed. After the reference speed is initialized, the reference speed determination module 306 may determine the reference speed based on the previous reference speed $(N_{ref})_{prev}$, the desired speed $(N_{des})$, and a speed constant $(K_s)$ using the following relationship:

$$N_{ref}=(N_{ref})_{prev}+K_s*(N_{des}-(N_{ref})_{prev}) \quad (3)$$

The speed constant may be a value between 0 and 1 (e.g., 0.1).

The reference speed determination module 306 may maintain the reference speed greater than a third speed during a vehicle coastdown. The third speed may be equal to the desired speed minus a second offset (e.g., 50 rpm). The reference speed may be equal to the desired speed when the actual speed is equal to the desired speed. The actual speed determination module 302, the desired speed determination module 304, and the reference speed determination module 306 may respectively output the actual speed, the desired speed, and the reference speed.

The desired speed and/or the reference speed may be adjusted based on whether a closed-throttle downshift is in progress. A downshift determination module 308 may output a signal indicating whether a closed-throttle downshift is in progress. The downshift determination module 308 may determine whether a closed-throttle downshift is in progress based on input received from the TCM 194. The downshift determination module 308 may determine that a closed-throttle downshift starts when the TCM 194 sends a message indicating that a downshift is in progress and the ECM 114 is in the speed mode (e.g., the throttle valve 112 is closed). The downshift determination module 308 may determine that a closed-throttle downshift ends when the actual gear position changes or when a vehicle coastdown ends (e.g., the driver tips into the accelerator pedal or the vehicle speed is less than a threshold such as 7 kph).

The desired speed determination module 304 may decrease the desired speed to less than the idle speed when a closed-throttle downshift is in progress. The desired speed determination module 304 may stop decreasing the desired speed when the desired speed is equal to a minimum speed (e.g., 600 rpm) that prevents an engine stall. Thus, the desired speed may be equal to the sum of the turbine speed and the first offset until the desired speed is equal to the minimum speed.

The reference speed determination module 306 may adjust the reference speed during a closed-throttle downshift based on the relationship between the actual speed of the engine 102 and the turbine speed at the start of the closed-throttle downshift. If the actual speed is less than the turbine speed at the start of a closed-throttle downshift, the reference speed determination module 306 may maintain the reference speed less than the turbine speed during the closed-throttle downshift. If the actual speed is greater than the turbine speed at the start of a closed-throttle downshift, the reference speed determination module 306 may maintain the reference speed greater than the turbine speed during the closed-throttle downshift.

If the actual speed is greater than the turbine speed at the start of a closed-throttle downshift, the reference speed determination module 306 may set the reference speed equal to a minimum of a fourth speed and a fifth speed. The fourth speed may be equal to the sum of the current turbine speed and a third offset (e.g., 150 rpm). The fifth speed may be equal to the sum of the turbine speed at the start of the closed-throttle downshift and a fourth offset (e.g., 800 rpm).

If the minimum of the fourth speed and the fifth speed is less than the previous reference speed, then the speed constant in relationship (3) may be set to zero to hold the reference speed at a constant value. If the minimum of the fourth speed and the fifth speed is greater than the previous reference speed, then the rate at which the reference speed is increased may be limited based on a gear position and a gear shift direction. For example, the reference speed may be increased by 5 rpm when a closed-throttle downshift is not in-progress and by 3 rpm when a closed-throttle downshift is in progress.

Figure 4:
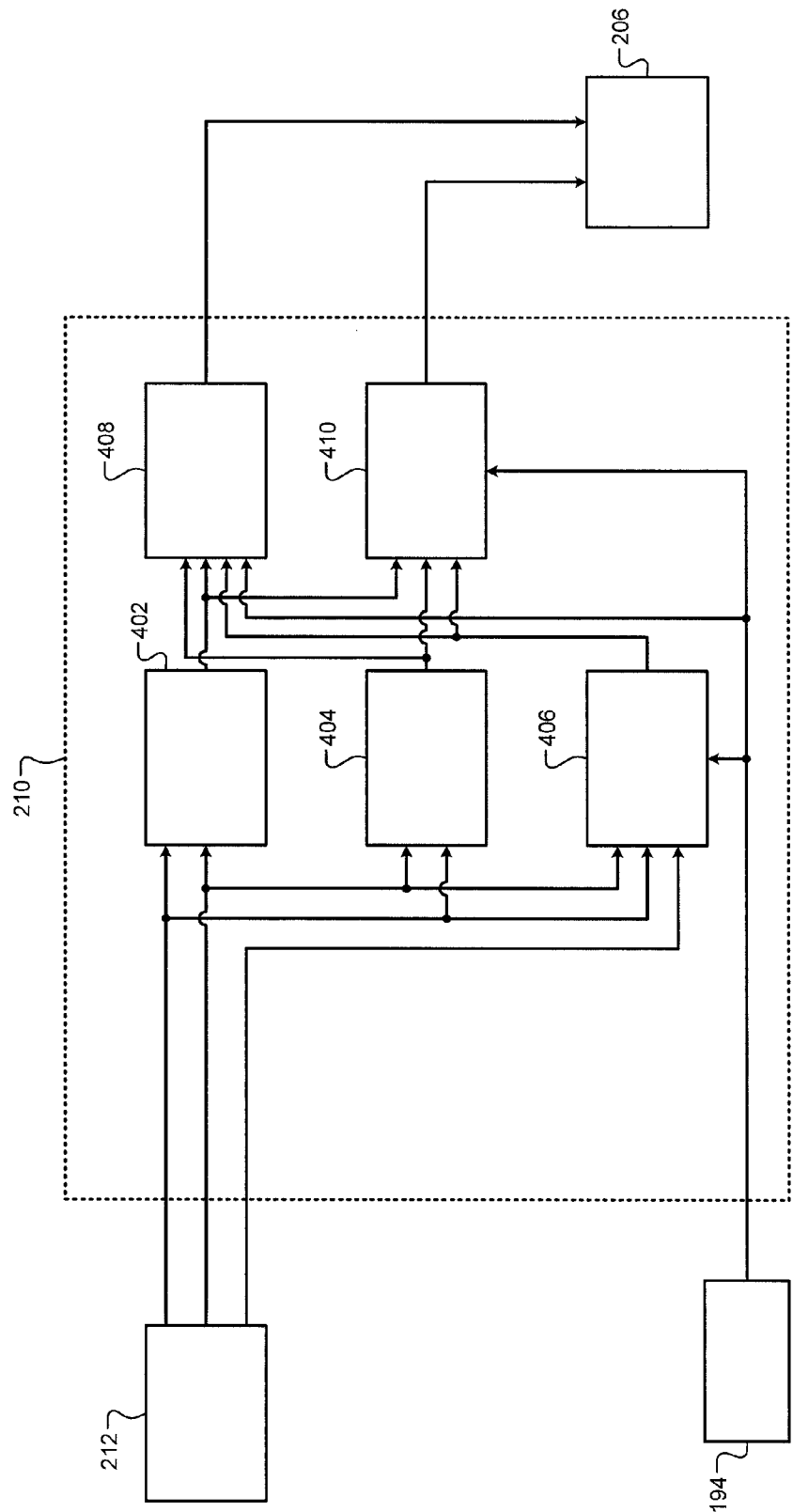
FIG. 4 is a functional block diagram of a second example control module according to the principles of the present disclosure.

Referring now to FIG. 4, an example implementation of the speed control module 210 includes a proportional gain determination module 402, an integral gain determination module 404, and an open-loop torque determination module 406. The proportional gain determination module 402 and the integral gain determination module 404 determine a proportional gain and an integral gain, respectively. The open-loop torque determination module 406 determines an open-loop torque.

An immediate torque determination module 408 and a predicted torque determination module 410 determine the immediate torque request and the predicted torque request, respectively, which are output by the speed control module 210. The immediate and predicted determination modules 408, 410 may determine the immediate and predicted torque requests based on the proportional gain, the integral gain, and the open-loop torque. The proportional and integral gains may be determined based on an error between the actual speed and the reference speed. The open-loop torque may be determined independent from this error.

The predicted torque determination module 410 may determine the predicted torque request $(T_{pr})$ based on a predicted open-loop torque $(OL_{pr})$, a predicted integral gain $(I_{pr})$, a predicted proportional gain $(P_{pr})$, a torque reserve $(T_{res})$, and a torque adjust $(T_{adj})$ using the following relationship:

$$T_{pr}=OL_{pr}+I_{pr}+P_{pr}+T_{res}+T_{adj}. \quad (4)$$

The open-loop torque determination module 406 may determine the predicted open-loop torque based on a maximum of a first torque and a second torque. The first torque may be a minimum predicted torque that prevents an engine stall. The minimum predicted torque may be adjusted based on engine operating conditions such as the actual speed of the engine 102, atmospheric pressure, the intake air temperature, and cam phaser positions.

The second torque may be equal to a sum of a desired coast torque and a predicted transmission load. The desired coast torque is an amount of engine torque that yields a desired deceleration rate during a vehicle coastdown. The open-loop torque determination module 406 may determine the desired coast torque based on the actual and reference speeds and a selected gear using a lookup table that accounts for the desired deceleration rate. The lookup table may be developed through calibration to yield a deceleration feel that is between a perpetual-coast feel and an engine-stall feel.

The open-loop torque determination module 406 may determine the desired coast torque based on a standardized speed to make the open-loop torque less dependent on the turbine speed. In turn, the open-loop torque may be more constant during a downshift, which may improve adaptive learning for transmission shifts. The standardized speed may be determined based on a filtered actual speed, an adjusted reference speed, and the selected gear. The filtered actual speed may be a maximum of the reference speed and a minimum of the previous actual speed and the current actual speed. The adjusted reference speed may be a minimum of the reference speed and a sixth speed that is determined based on the selected gear using a lookup table. For example only, the sixth speed may be approximately 600 rpm.

The predicted transmission load may include a steady-state load and a transient load. The steady-state load may be due to the inertia of components that are coupled to the engine 102 when the transmission is in gear. The transient load may be due to the inertia of components (e.g., clutches) that are coupled to the engine 102 when the transmission is shifting gears.

The integral gain determination module 404 may determine the predicted integral gain ($I_{pr}$) based on an integral constant ($K_i$), the reference speed ($N_{ref}$), the actual speed ($N_{act}$), and the previous predicted integral gain ($I_{pr})_{prev}$ using the following relationship:

$$I_{pr}=K_i^*(N_{ref}-N_{act})+(I_{pr})_{prev}. \quad (5)$$

The integral gain determination module 404 may initialize the previous predicted integral gain to avoid a sudden change in engine toque when the speed mode is enabled. The integral gain determination module 404 may initialize the previous predicted integral gain ($I_{pr})_{prev}$ based on the previous predicted torque request ($T_{pr})_{prev}$, the predicted open-loop torque ($OL_{pr}$), and the torque reserve ($T_{res}$) using the following relationship:

$$(I_{pr})_{prev}=(T_{pr})_{prev}-OL_{pr}-T_{res}. \quad (6)$$

After the previous predicted integral gain is initialized, the integral gain determination module 404 may set the previous predicted integral gain equal to the predicted integral gain that is calculated in the previous iteration loop.

The proportional gain determination module 402 may determine the predicted proportional gain ($P_{pr}$) based on a proportional constant ($K_p$), the reference speed ($N_{ref}$), and the actual speed ($N_{act}$) using the following relationship:

$$P_{pr}=K_p^*(N_{ref}-N_{act}). \quad (7)$$

The predicted proportional gain may be zero when the speed mode is enabled since the reference speed may be set to the actual speed when the speed mode is enabled.

The predicted torque determination module 410 may determine the torque reserve in the manner described above with respect to the reserves/loads module 220. Alternatively, the reserves/loads module 220 may output the torque reserve to the predicted torque determination module 410. The reserves/loads module 220 may not adjust the predicted and immediate torque requests when the speed mode is enabled.

The predicted torque determination module 410 may determine the torque adjust based on maximum and minimum torque limits for the predicted torque request. The predicted torque determination module 410 may set the torque adjust equal to zero when the predicted torque request is within the maximum and minimum torque limits. When the predicted torque request is greater than the maximum torque limit ($T_{max}$), the predicted torque determination module 410 may determine the torque adjust using the following relationship:

$$T_{adj}=T_{max}-(OL_{pr}+I_{pr}+P_{pr}+T_{res}). \quad (8)$$

When the predicted torque request is less than the minimum torque limit ($T_{min}$), the predicted torque determination module 410 may determine the torque adjust using the following relationship:

$$T_{adj}=T_{min}-(OL_{pr}+I_{pr}+P_{pr}+T_{res}). \quad (9)$$

Although the torque adjust may be used to determine the predicted torque request, the torque adjust may not be used to determine the immediate torque request. Thus, the immediate torque request may not be affected when the predicted torque request is outside of the maximum or minimum torque limit, as may occur during a closed-throttle downshift. This may improve the response time of the engine system 100 when one or more loads are applied to the engine 102.

When the predicted torque request is no longer outside of the maximum and minimum torque limits, the torque adjust is decayed to zero. For example, the predicted torque determination module 410 may determine the torque adjust ($T_{adj}$) based on the previous torque adjust ($T_{adj})_{prev}$, an integral constant ($K_i$), the reference speed ($N_{ref}$), and the actual speed ($N_{act}$) using the following relationship:

$$T_{adj}=(T_{adj})_{prev}+K_i^*(N_{ref}-N_{act}). \quad (10)$$

The predicted torque determination module 410 may only determine the torque adjust using the above relationship when the sign of the increment $K_i^*(N_{ref}-N_{act})$ is opposite from the sign of the previous torque adjust ($T_{adj})_{prev}$. This prevents the predicted torque determination module 410 from driving the predicted torque request back to the maximum or minimum torque limit.

The immediate torque determination module 408 may determine the immediate torque request ($T_{im}$) based on an immediate open-loop torque ($OL_{im}$), an immediate integral gain ($I_{im}$), and an immediate portional gain ($P_{im}$) using the following relationship:

$$T_{im}=OL_{im}+I_{im}+P_{im}. \quad (11)$$

The open-loop torque determination module 406 may determine the immediate open-loop torque based on a maximum of a third torque and a fourth torque. The third torque may be a minimum of the predicted open-loop torque and a torque factor. The torque factor ($T_{fct}$) may be determined based on the desired speed ($N_{des}$) and the turbine speed ($N_t$) using the following relationship:

$$T_{fct}=N_{des}/(N_t/N_{des})^2. \quad (12)$$

The fourth torque may be equal to a sum of the desired coast torque and an immediate transmission load. As with the predicted transmission load, the immediate transmission load may include a steady-state load and a transient load. However, the immediate transmission load may be a transmission load that is currently applied to the engine 102, while the predicted transmission load may be a transmission load that will be applied to the engine 102 in the near future.

The integral gain determination module 404 may determine the immediate integral gain ($I_{im}$) based on an integral constant ($K_i$), the reference speed ($N_{ref}$), the actual speed ($N_{act}$), and the previous predicted integral gain ($I_{pr})_{prev}$ using the following relationship:

$$I_{im}=K_i^*(N_{ref}-N_{act})+(I_{pr})_{prev}. \quad (13)$$

The proportional gain determination module 402 may determine the immediate proportional gain ($P_{im}$) based on a proportional constant ($K_p$), the reference speed ($N_{ref}$), and the actual speed ($N_{act}$) using the following relationship:

$$P_{im}=K_p*(N_{ref}-N_{act}). \quad (14)$$

The immediate proportional gain may be zero when the speed mode is enabled since the reference speed may be set to the actual speed when the speed mode is enabled.

The immediate torque determination module 408 may limit a change in the immediate torque request during a closed-throttle downshift to prevent lash crossing. When the turbine speed is greater than the actual speed of the engine 102 at the start of the closed-throttle downshift, the immediate torque determination module 408 may limit the immediate torque request to a minimum of a fifth torque and the immediate torque request that results from relationship (11) discussed above. The fifth torque may be equal to the sum of a torque offset and an average value of the immediate torque request during an initial period (e.g., 100 milliseconds) of the closed-throttle downshift. The torque offset may be adjusted based on the vehicle deceleration rate. For example, the torque offset may be 20 Newton-meters (Nm) at a lower deceleration rate and may be 80 Nm at a higher deceleration rate.

When the turbine speed is greater than the actual speed of the engine 102 at the start of the closed-throttle downshift, the immediate torque determination module 408 may limit the immediate torque request to a maximum of a sixth torque and the immediate torque request that results from relationship (11). The sixth torque may be equal to the average value of the immediate torque request minus the torque offset.

If the immediate torque request is limited when the closed-throttle downshift is complete, then the immediate torque determination module 408 may ramp the immediate torque request to the value that results from relationship (11). For example, the immediate torque request ($T_{im}$) may be determined based on the previous immediate torque request ($T_{im})_{prev}$, a multiplier (M), and the immediate torque request that results from relationship (11) ($T_{im})_{11}$ using the following relationship:

$$T_{im}=(T_{im})_{prev}+M*((T_{im})_{11}-(T_{im})prev). \quad (15)$$

The multiplier may be between 0 and 1 and may be increased or decreased as the vehicle deceleration rate respectively increases or decreases.

Figure 5:
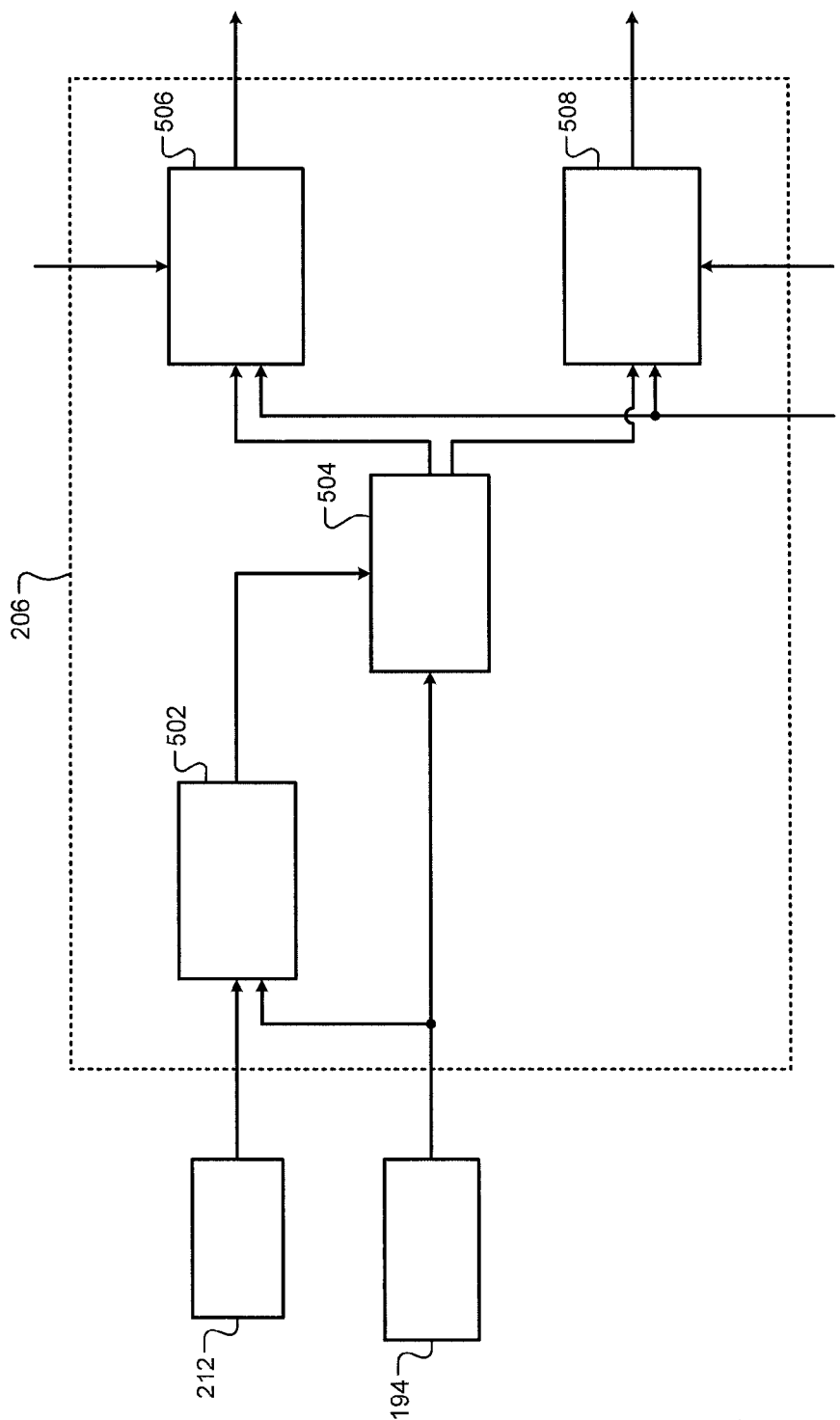
FIG. 5 is a functional block diagram of a third example control module according to the principles of the present disclosure.

Referring now to FIG. 5, an example implementation of the propulsion torque arbitration module 206 includes a slip determination module 502 and a mode enablement module 504. The slip determination module 502 determines torque converter slip based on a difference between the actual speed of the engine 102 and the turbine speed. The slip determination module 502 may receive the actual speed from the speed trajectory module 212 and receive the turbine speed from the TCM 194.

The mode enablement module 504 may enable the speed mode when the driver removes their foot from the accelerator pedal. The mode enablement module 504 may not enable the speed mode when the torque converter is locked and the torque converter slip is less than a first threshold (e.g., 10 rpm). The mode enablement module 504 may not enable the speed mode when the torque converter slip is controlled and the torque converter slip is less than a second threshold (e.g., 50 rpm). The mode enablement module 504 may not enable the speed mode when a fuel cutoff mode is enabled. When the fuel cutoff mode is enabled, one or more cylinders of the engine 102 may be deactivated and fuel delivery to deactivated cylinders is stopped. The fuel cutoff mode may be enabled when the vehicle is decelerating.

A predicted torque determination module 506 and an immediate torque determination module 508 determine the predicted torque request and the immediate torque request, respectively, that are output by the propulsion torque arbitration module 206. The predicted and immediate torque determination modules 506, 508 may determine the predicted and immediate torque requests based on signals received from the mode enablement module 504 indicating whether the speed mode is enabled. The predicted and immediate torque determination modules 506, 508 may output the predicted and immediate torque requests received from the speed control module 210 when the speed mode is enabled.

Figure 6:
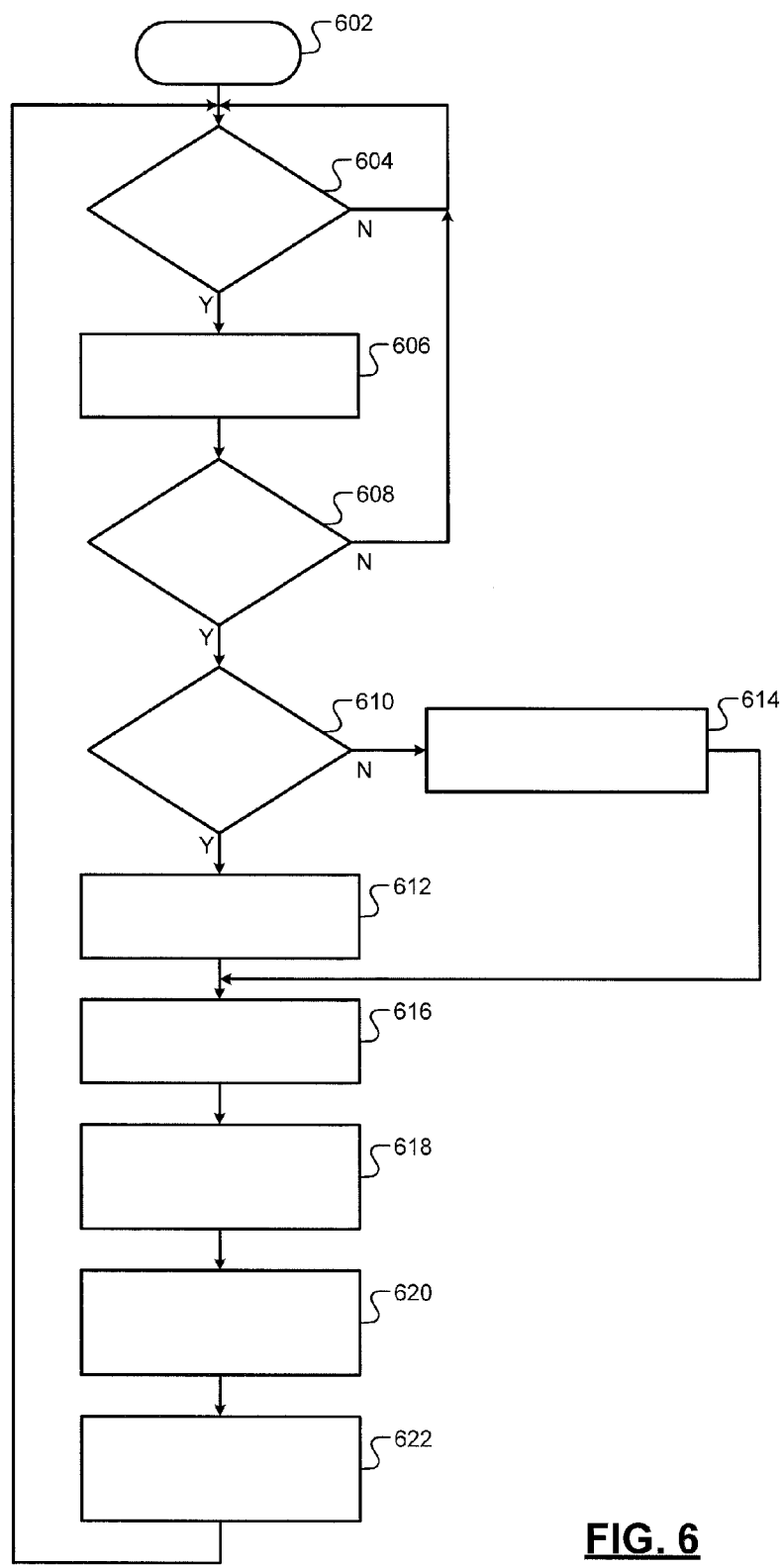
FIG. 6 is a flowchart illustrating a second example control method according to the principles of the present disclosure.

Referring now to FIG. 6, a method for controlling the torque output of an engine during a closed-throttle downshift starts at 602. At 604, the method determines whether a speed mode is enabled. The method continues to 606 and controls the torque output of the engine based on a desired speed of the engine when the speed mode is enabled. The method may control the torque output of the engine based on other factors, such as a driver torque request, when the speed mode is not enabled.

The method may enable the speed mode when a driver removes their foot from an accelerator pedal. The method may not enable the speed mode when a torque converter is locked and the torque converter slip is less than a first threshold (e.g., 10 rpm). The method may not enable the speed mode when the torque converter slip is controlled and the torque converter slip is less than a second threshold (e.g., 50 rpm). The method may not enable the speed mode when a fuel cutoff mode is enabled. When the fuel cutoff mode is enabled, one or more cylinders of the engine may be deactivated and fuel delivery to deactivated cylinders is stopped. The fuel cutoff mode may be enabled when a vehicle is decelerating (e.g., during a vehicle coastdown).

At 606, the method initializes a reference speed and a predicted integral gain to prevent torque disturbances. The method may control the torque output of the engine to achieve the reference speed and may adjust the reference speed to transition the actual speed of the engine to the desired speed. The method may initialize the reference speed by setting the reference speed equal to the actual speed of the engine.

The method may determine a predicted torque request based on the predicted integral gain to reduce the difference between the actual speed of the engine and the reference speed. The method may adjust slow engine actuators based on the predicted torque request. The method may initialize the predicted integral gain using relationship (6) discussed above.

At 608, the method determines whether a closed-throttle downshift is started. The method may determine whether a closed-throttle downshift is in progress based on signals sent by a TCM. The method may determine that a closed-throttle downshift is started when the TCM sends a message indicating that a downshift is in progress and the speed mode is enabled (e.g., the throttle valve 112 is closed). The method may determine that a closed-throttle downshift is complete when an actual gear position changes or when a vehicle coastdown ends (e.g., the driver tips into the accelerator pedal or the vehicle speed is less than a threshold such as 7 kph). The method continues at 610 when a closed-throttle downshift is started.

At 610, the method determines whether the actual speed of the engine is less than the turbine speed. If the actual speed is less than the turbine speed, the method continues at 612 and maintains the reference speed less than the turbine speed. If the actual speed is greater than or equal to the turbine speed, the method continues at 614 and maintains the reference speed greater than the turbine speed. At 616, the method maintains the reference speed greater than the desired speed minus a speed offset (e.g., 50 rpm). In other words, the method ensures that the reference speed does not drop below the desired speed by more than the speed offset.

At 618, the method limits a change in an immediate torque request to prevent lash crossing. The method may adjust fast engine actuators based on the immediate torque request. When the turbine speed is greater than the actual speed of the engine at the start of the closed-throttle downshift, the method may limit the immediate torque request to a minimum of a first torque and the immediate torque request from relationship (11).

The first torque may be equal to the sum of a torque offset and an average value of the immediate torque request during an initial period (e.g., 100 milliseconds) of the closed-throttle downshift. The torque offset may be adjusted based on a vehicle deceleration rate. For example, the torque offset may be 20 Nm at a lower deceleration rate and may be 80 Nm at a higher deceleration rate. When the turbine speed is greater than the actual speed of the engine at the start of the closed-throttle downshift, the method may limit the immediate torque request to a maximum of a second torque and the immediate torque request from relationship (11). The second torque may be equal to the average value of the immediate torque request minus the torque offset.

At 620, the method adjusts a torque reserve and a transmission load based on the vehicle deceleration rate to ensure that the immediate torque request may be adjusted to prevent engine speed droop during fast deceleration. The method may increase or decrease the torque reserve as the vehicle deceleration rate respectively increases or decreases. Similarly, the method may increase or decrease the transmission load as the vehicle deceleration rate respectively increases or decreases.

At 622, the method maintains the predicted torque request within maximum and minimum torque limits. The method may maintain the predicted torque request within the maximum and minimum torque limits using a torque adjust as described above with respect to relationships (4), (8), and (9). Thus, the method may maintain the predicted torque request within the maximum and minimum torque limits without limiting the immediate torque request.

Figure 7:
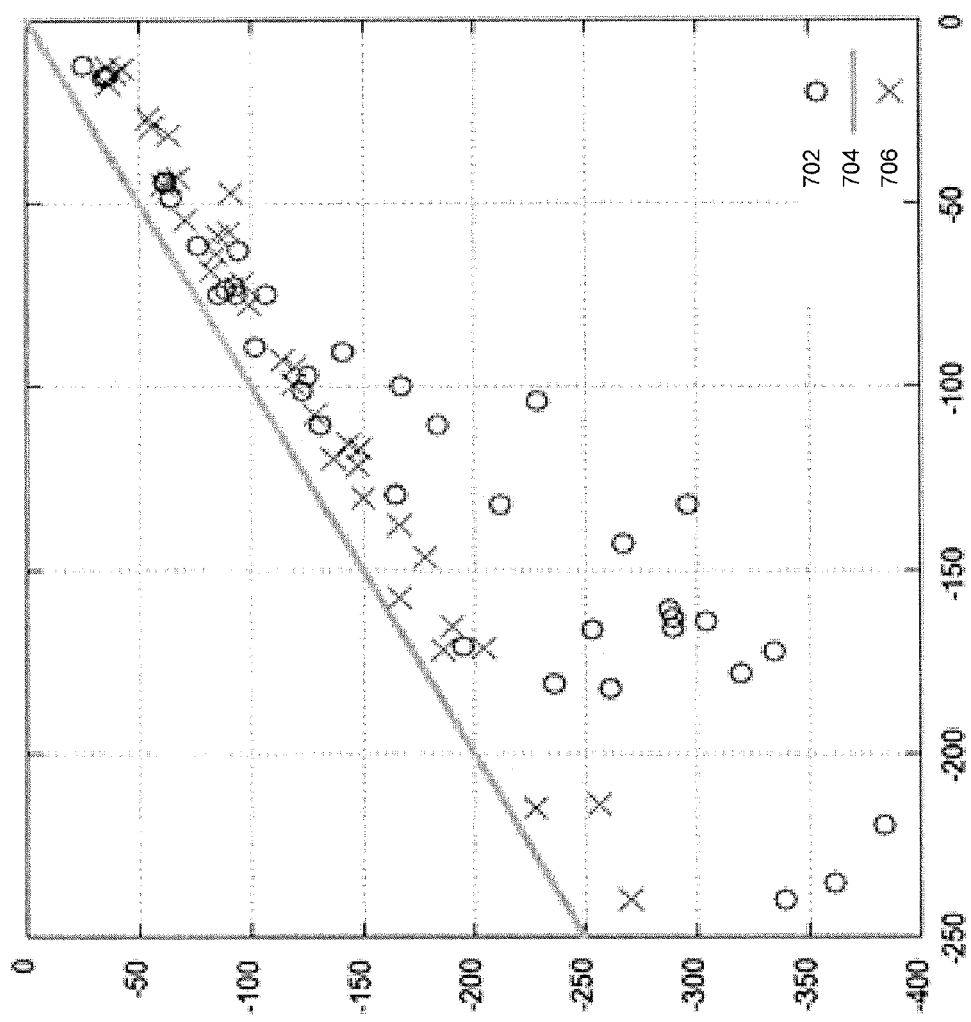
FIG. 7 is a graph illustrating an example deceleration rate during a downshift when a throttle valve is closed according to the principles of the present disclosure.

Referring now to FIG. 7, a graph illustrates a first downshift set 702, a target deceleration rate 704, and a second downshift set 706. The x-axis represents turbine acceleration (in rpm/second) at the start of a closed-throttle downshift. The y-axis represents a minimum value of turbine acceleration during the closed-throttle downshift. Each data point in the first downshift set 702 and the second downshift set 706 represents a closed-throttle downshift. The target deceleration rate 704 is a constant deceleration rate during the closed-throttle downshift, which prevents driveline bump.

The first downshift set 702 illustrates turbine deceleration rates during a closed-throttle downshift when engine torque is not controlled using the systems and methods described above. The second downshift set 706 illustrates turbine deceleration rates during a closed-throttle downshift when engine torque is controlled using the systems and methods described above. Thus, controlling engine torque during a closed-throttle downshift using the systems and methods described above yields turbine deceleration rates that are closer to the target deceleration rate 704.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements. As used herein, the phrase at least one of A, B, and C should be construed to mean a logical (A or B or C), using a non-exclusive logical OR. It should be understood that one or more steps within a method may be executed in different order (or concurrently) without altering the principles of the present disclosure.

As used herein, the term module may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used above, may include software, firmware, and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

What is claimed is:

1. A system comprising:
   a downshift determination module that determines when a closed-throttle downshift occurs and that generates a signal indicating when the closed-throttle downshift occurs, wherein the closed-throttle downshift is a downshift of a transmission when a throttle valve of an engine is closed; and
   a speed control module that receives the signal and that controls engine speed based on turbine speed during the closed-throttle downshift while the throttle valve is closed, wherein the turbine speed is a speed of a turbine in a torque converter that couples the engine to the transmission.

2. The system of claim 1, wherein the speed control module:
   (i) maintains the engine speed less than the turbine speed during the closed-throttle downshift when the engine speed is less than the turbine speed when the closed-throttle downshift starts; and
   (ii) maintains the engine speed greater than the turbine speed during the closed-throttle downshift when the engine speed is greater than the turbine speed when the closed-throttle downshift starts.

3. A system comprising:
   a downshift determination module that determines when a closed-throttle downshift occurs, wherein the closed-throttle downshift is a downshift of a transmission when a throttle valve of an engine is closed;

a speed control module that controls engine speed based on turbine speed during the closed-throttle downshift, wherein the turbine speed is a speed of a turbine in a torque converter that couples the engine to the transmission, and wherein the speed control module:

(i) maintains the engine speed less than the turbine speed during the closed-throttle downshift when the engine speed is less than the turbine speed when the closed-throttle downshift starts; and (ii) maintains the engine speed greater than the turbine speed during the closed-throttle downshift when the engine speed is greater than the turbine speed when the closed-throttle downshift starts; and a desired speed determination module that determines a desired speed of the engine during a vehicle coastdown based on a maximum of a first speed and a second speed, wherein the first speed is an idle speed and the second speed is equal to a sum of the turbine speed and a first offset.

4. The system of claim 3, wherein the speed control module maintains the engine speed greater than a third speed during the vehicle coastdown, wherein the third speed is equal to a difference between the desired speed and a second offset.

5. The system of claim 3, further comprising:

a torque determination module that determines a torque request based on the desired speed, wherein the torque determination module limits a change in the torque request during the closed-throttle downshift based on a vehicle deceleration rate; and a torque control module that controls engine torque based on the torque request during the vehicle coastdown.

6. The system of claim 5, wherein the torque control module controls the engine torque independent from the torque request during the vehicle coastdown:

when the torque converter is locked and slip of the torque converter is less than a first threshold;

when the slip is controlled and the slip is less than a second threshold; and when fuel delivery to at least one cylinder of the engine is stopped.

7. The system of claim 5, wherein the torque determination module determines the torque request based on a sum of an open-loop torque, an integral gain, and a proportional gain, wherein the open-loop torque is based on a maximum of:

(i) a minimum torque that prevents engine stall; and (ii) a sum of a coast torque and a transmission load.

8. The system of claim 7, wherein the torque determination module sets the integral gain equal to a difference between a previous torque request and the open-loop torque when the torque control module starts to control the engine torque based on the torque request.

9. The system of claim 7, wherein the torque request includes a predicted torque request and an immediate torque request, and the torque determination module limits the predicted torque request based on the minimum torque and a maximum torque without limiting the immediate torque request.

10. The system of claim 7, wherein the torque determination module determines the torque request further based on a torque reserve and determines the torque reserve and the transmission load based on the vehicle deceleration rate.

11. A method comprising:

determining when a closed-throttle downshift occurs, wherein the closed-throttle downshift is a downshift of a transmission when a throttle valve of an engine is closed; and controlling engine speed based on turbine speed during the closed-throttle downshift while the throttle valve is closed, wherein the turbine speed is a speed of a turbine in a torque converter that couples the engine to the transmission.

12. The method of claim 11, further comprising:

maintaining the engine speed less than the turbine speed during the closed-throttle downshift when the engine speed is less than the turbine speed when the closed-throttle downshift starts; and maintaining the engine speed greater than the turbine speed during the closed-throttle downshift when the engine speed is greater than the turbine speed when the closed-throttle downshift starts.

13. A method comprising:

determining when a closed-throttle downshift occurs, wherein the closed-throttle downshift is a downshift of a transmission when a throttle valve of an engine is closed;

controlling engine speed based on turbine speed during the closed-throttle downshift, wherein the turbine speed is a speed of a turbine in a torque converter that couples the engine to the transmission;

maintaining the engine speed less than the turbine speed during the closed-throttle downshift when the engine speed is less than the turbine speed when the closed-throttle downshift starts;

maintaining the engine speed greater than the turbine speed during the closed-throttle downshift when the engine speed is greater than the turbine speed when the closed-throttle downshift starts; and determining a desired speed of the engine during a vehicle coastdown based on a maximum of a first speed and a second speed, wherein the first speed is an idle speed and the second speed is equal to a sum of the turbine speed and a first offset.

14. The method of claim 13, further comprising maintaining the engine speed greater than a third speed during the vehicle coastdown, wherein the third speed is equal to a difference between the desired speed and a second offset.

15. The method of claim 13, further comprising:

determining a torque request based on the desired speed;

limiting a change in the torque request during the closed-throttle downshift based on a vehicle deceleration rate; and controlling engine torque based on the torque request during the vehicle coastdown.

16. The method of claim 15, further comprising controlling the engine torque independent from the torque request during the vehicle coastdown:

when the torque converter is locked and slip of the torque converter is less than a first threshold;

when the slip is controlled and the slip is less than a second threshold; and when fuel delivery to at least one cylinder of the engine is stopped.

17. The method of claim 15, further comprising determining the torque request based on a sum of an open-loop torque, an integral gain, and a proportional gain, wherein the open-loop torque is based on a maximum of:

(i) a minimum torque that prevents engine stall; and (ii) a sum of a coast torque and a transmission load.

18. The method of claim 17, further comprising setting the integral gain equal to a difference between a previous torque request and the open-loop torque when starting to control the engine torque based on the torque request.

19. The method of claim 17, wherein the torque request includes a predicted torque request and an immediate torque request, the method further comprising limiting the predicted torque request based on the minimum torque and a maximum torque without limiting the immediate torque request.

20. The method of claim 17, further comprising determining the torque request further based on a torque reserve and determining the torque reserve and the transmission load based on the vehicle deceleration rate.

* * * * *